United States Patent
Phillips

(10) Patent No.: US 6,799,186 B2
(45) Date of Patent: Sep. 28, 2004

(54) SLA MONITOR CALENDAR BUFFERING

(75) Inventor: Brent R. Phillips, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 429 days.

(21) Appl. No.: 09/975,229

(22) Filed: Oct. 11, 2001

(65) Prior Publication Data

US 2003/0074347 A1 Apr. 17, 2003

(51) Int. Cl.$^7$ .............................................. G06F 17/30
(52) U.S. Cl. .................................................. 707/104.1
(58) Field of Search .............................. 707/104.1, 102, 707/100; 713/201; 714/43

(56) References Cited

U.S. PATENT DOCUMENTS

| | | |
|---|---|---|
| 5,479,642 A | 12/1995 | Jarvis |
| 5,758,113 A * | 5/1998 | Peet et al. .................. 712/203 |
| 5,787,470 A | 7/1998 | DeSimone et al. |
| 5,799,154 A * | 8/1998 | Kuriyan ...................... 709/223 |
| 5,890,213 A | 3/1999 | Sokolov |
| 5,974,238 A * | 10/1999 | Chase, Jr. ................... 709/248 |
| 6,128,701 A | 10/2000 | Malcolm et al. |
| 6,141,778 A * | 10/2000 | Kane et al. .................. 713/201 |
| 6,381,644 B2 * | 4/2002 | Munguia et al. ............ 709/225 |
| 6,565,608 B1 * | 5/2003 | Fein et al. ................... 715/501.1 |

* cited by examiner

Primary Examiner—Safet Metjahic
Assistant Examiner—Sana Al-Hashemi
(74) Attorney, Agent, or Firm—Cardinal Law Group; David A. Mims, Jr.

(57) ABSTRACT

The invention provides a method for increasing the efficiency of accessing interdependent data by caching the relevant data in multiple cache buffers. A user may input a preference for an amount of a first level of information and a refresh time period for the first level of information. A user may also input a preference for an amount of a second level of information and a refresh time period for the second level of information. The first level of information and at least one reference to the second level of information may be cached in a first buffer. The second level of information may be cached in a second buffer. The first level of information, along with a reference to the second level of information, and the second level of information may be refreshed based upon user preferences. Upon request for the interdependent data, the first level of data may be retrieved. The reference to the second level of data may be determined and then the second level of data may be retrieved based on the given reference.

19 Claims, 3 Drawing Sheets

SLA MONITOR CALENDAR BUFFERING

FIELD OF THE INVENTION

The present invention relates generally to cache memory.

BACKGROUND OF THE INVENTION

In today's problem management software there is a strong need for Service Level Agreement (SLA) metrics. These metrics are very important to the quality assurance for any and all help desk centers. Some problems are severe enough that a resolution must take place within a few minutes. Since the number of problems created per minute in a global setting is very high, the timely calculation is critical for such metrics, as events and escalations may be needed if the SLA is not met.

The data needed to calculate these metrics is stored in the system's database and must be accessed numerous times throughout the day. Since accessing data directly from the database has proven to be rather time consuming, and because the precision of the SLA calculations are important, there has emerged a need for a product that calculates SLA metrics to access this data more quickly so that the application can handle many more transactions per minute to meet the demands and expand the services offered to customers.

SUMMARY OF THE INVENTION

One aspect of the present invention is a method for providing increased efficiency in accessing interdependent data. A user may input a preference for an amount of a first level of information and a refresh time period for the first level of information. A user may also input a preference for an amount of a second level of information and a refresh time period for the second level of information. The first level of information and at least one reference to the second level of information may be cached in a first buffer. The second level of information may be cached in a second buffer. The first level of information, along with a reference to the second level of information, and the second level of information may be refreshed based upon user preferences. Upon request for the interdependent data, the first level of data may be retrieved. The reference to the second level of data may be determined and then the second level of data may be retrieved based on the given reference.

Another aspect of the present invention is a system for providing increased efficiency in accessing interdependent data, comprising means for receiving a user preference for an amount of a first level of information and a refresh time period for a first level of information and also receiving a user preference for an amount of a second level of information and a refresh time period for a second level of information. The system also comprises means for caching a first level of information and at least one reference to a second level of information from said database into a first buffer and also means for caching a second level of information from said database into a second buffer. The system also comprises means for refreshing a first level of information and a reference to a second level of information in a first buffer and a second level of information in a second buffer based on user preferences. Upon receiving a request for interdependent data there are means for retrieving a first level of data. The system also comprises means for determining a reference to a second level of data based on a request and means for retrieving a second level data based on a determined reference.

Another aspect of the present invention is a computer usable medium storing a program for computer readable code for providing increased efficiency in accessing interdependent data, comprising computer readable code for receiving a user preference for an amount of a first level of information and a refresh time period for a first level of information and also receiving a user preference for an amount of a second level of information and a refresh time period for a second level of information. The computer usable medium also comprises code for caching a first level of information and at least one reference to a second level of information in a first buffer and code for caching a second level of information in a second buffer. The computer usable medium also comprises code for refreshing a first level of information and a reference to a second level of information in a first buffer and a second level of information in a second buffer based on user preferences. Upon receiving a request for interdependent data there is code for retrieving a first level of data. The computer usable medium also comprises code for determining a reference to a second level of data based on a request and also code for retrieving a second level data based on a determined reference.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
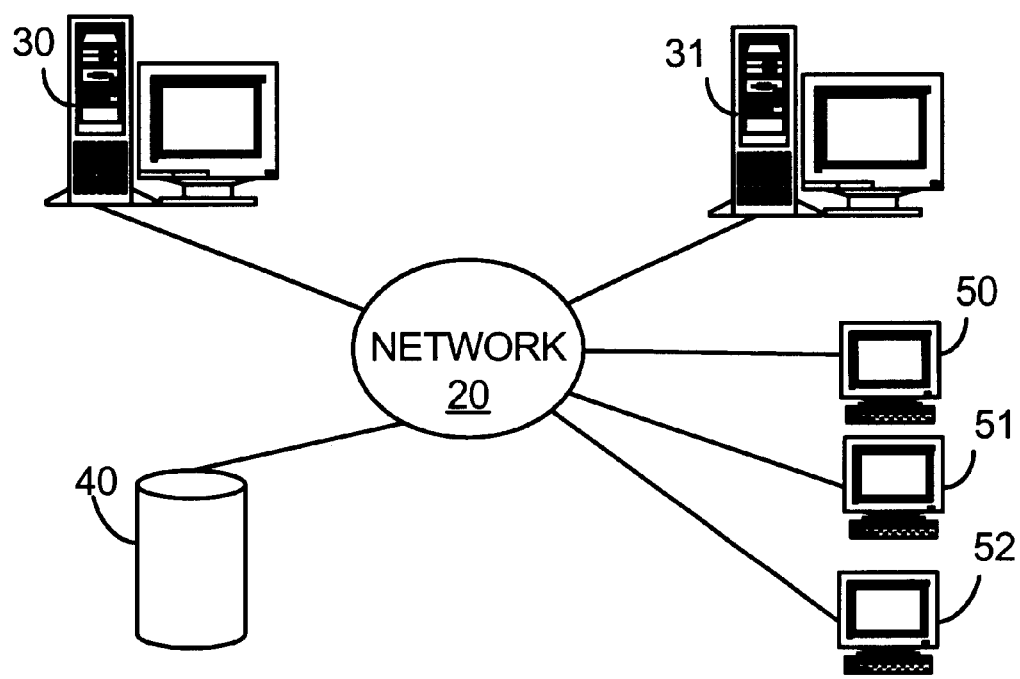
FIG. 1 is a block diagram illustrating one embodiment of a system for providing increased efficiency in accessing interdependent data.

Referring to FIG. 1, one embodiment of a system for providing increased efficiency in accessing interdependent data is generally shown at numeral 10. In this example, the shown system is a network running a help desk software. This network, 20, may provide communication links between various devices and computers connected together within this environment. Network 20 may include permanent connections, such as wire or fiber optic cables, or temporary connections made through telephone or wireless communications.

In the example shown, a primary server 30 may be used for running the help desk software. One example of help desk software is Tivoli's Problem Management software, which is available from IBM. There may be an additional server running the SLA Monitor, shown at 31. The SLA Monitor may be responsible for scanning the database of problems to check for breaches of existing Service Level Agreements. Both servers mentioned may have a direct connection to the database 40, which may contain such data as location, customer, and problem information. Clients 50, 51, and 52 may also exist within the environment and may represent additional users within the depicted help desk center.

Figure 2:
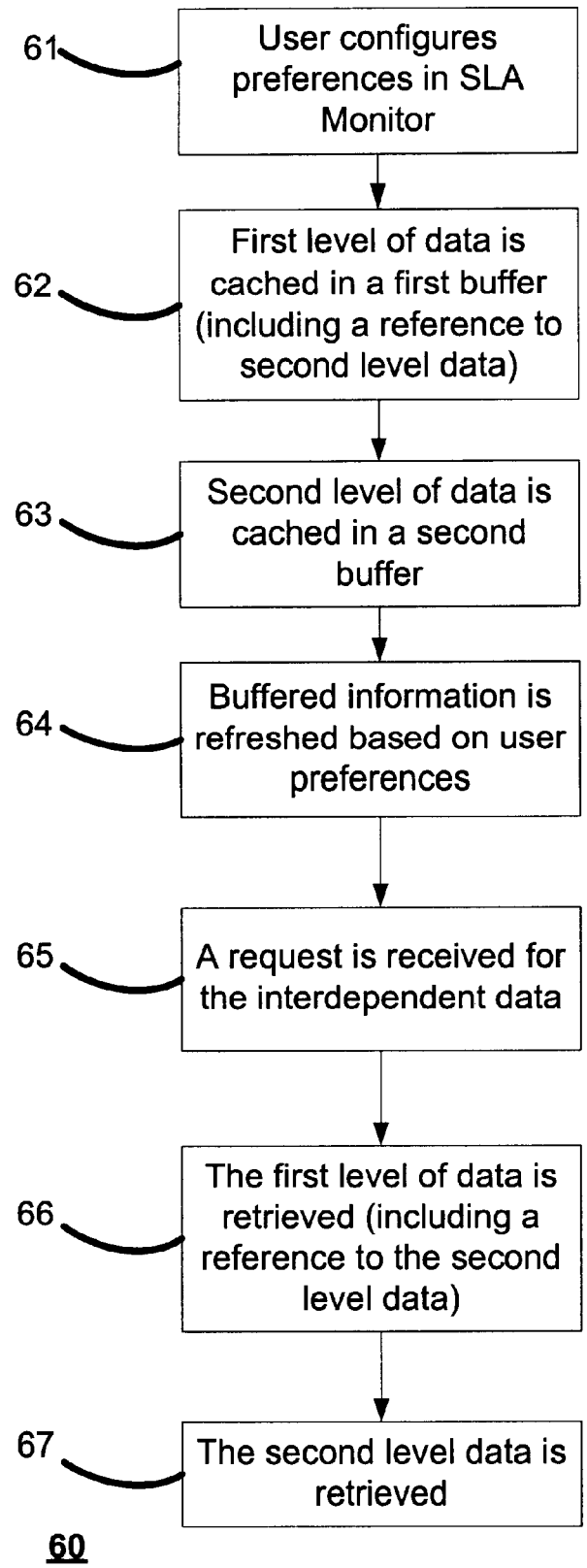
FIG. 2 is a flow chart illustrating one embodiment of a method for providing increased efficiency in accessing interdependent data.

Referring to FIG. 2, one embodiment of a method for providing increased efficiency in accessing interdependent data is generally shown at numeral 60. This example shows a method of loading and accessing data in the multiple cache buffers. A user may input a preference for an amount of a first level of information and a refresh time period for the first level of information into the configuration settings on the SLA Monitor, depicted at 61. A user may also input a preference for an amount of a second level of information and a refresh time period for the second level of information into the SLA Monitor, also depicted at 61. In a second step of the process, 62, the first level of information and at least one reference to the second level of information may be cached in a first buffer. In a third step of the process, 63, the second level of information may be cached in a second buffer. The first level of information, along with a reference to the second level of information, and the second level of information may be refreshed based upon user preferences, shown at 64. A request is received for the interdependent data, shown at 65. Upon request for the interdependent data, the first level of data may be retrieved 66. The reference to the second level of data may be determined and then the second level of data may be retrieved based on the given reference 67.

Figure 3:
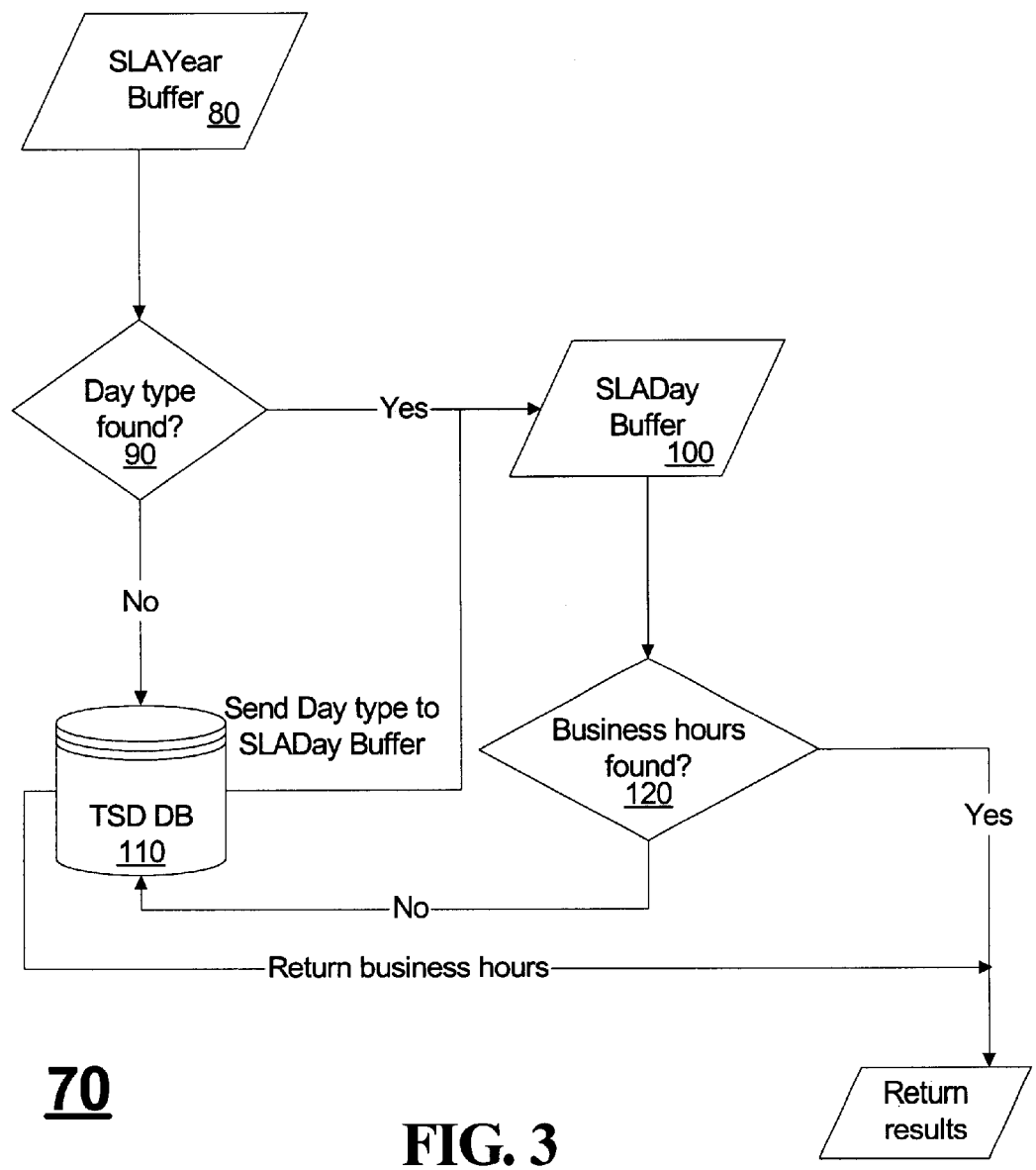
FIG. 3 is a flow chart illustrating one embodiment of another method for providing increased efficiency in accessing interdependent data.

Referring to FIG. 3, another embodiment of a method for providing increased efficiency in accessing interdependent data is generally shown at numeral 70. This example shows a method of accessing data from the multiple cache buffers. It represents how part of, for example, a help desk software module retrieves the data it needs using the present invention.

Buffer 80 may store each active calendar record from the system's database, containing data such as the calendar id, day types for days within each calendar, the start and end dates for the calendar, and the calendar id for the next calendar to be used. When there is a request for calendar information, the SLA Monitor software may first look in the SLAYear Buffer 80, for the needed information. If the day type variable information is found, process 90, the software may then search for more specific information in the second buffer 100. This second buffer, the SLADay Buffer, may store a record for each day type found in the calendar record, including the business hours for each particular day.

If the day type variable is not retrieved from the first buffer 80, process 90 may redirect its search to the system's database 110. It may also get the reference from the database to the second level of data and may then access the second level buffer 100, rather than accessing the database a second time. This may reduce the calls to the database by fifty percent or more.

Once the second level of information, or business hours in this example, is retrieved from the second level buffer, shown at 120, it is returned to the SLA Monitor software.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for providing increased efficiency in accessing interdependent data comprising:
   receiving a user preference for an amount of a first level of information and a refresh time period for the first level of information;
   receiving a user preference for an amount of a second level of information and a refresh time period for the second level of information;
   caching the first level of information and at least one reference to the second level of information in a first buffer;
   caching the second level of information in a second buffer;
   refreshing the first level of information and a reference to the second level of information in the first buffer and the second level of information in the second buffer based on user preferences;
   receiving a request for the interdependent data;
   retrieving the first level data;
   determining the reference to the second level data based on the request; and
   retrieving the second level data based on the determined reference.

2. The method of claim 1 wherein the interdependent data is calendar data comprising calendar, year and day records.

3. The method of claim 1 wherein the user preference for an amount of first level data must be an integer in the range of 0 to 999, representing days.

4. The method of claim 1 wherein the user preference for the refresh time must be an integer in the range of 0 and 999, representing minutes.

5. The method of claim 1 wherein the retrieval of data may be done by a software application.

6. The method of claim 1 wherein the cache buffers exist in memory on a computer system that is accessible by user endpoints.

7. The method of claim 1 wherein if the retrieval of the first level of information is unsuccessful, the reference to the second level of information may be gathered directly from the database.

8. A computer usable medium including a program for providing increased efficiency in accessing interdependent data comprising:
   computer readable code for receiving a user preference for an amount of a first level of information and a refresh time period for a first level of information;
   computer readable code for receiving a user preference for an amount of a second level of information and a refresh time period for a second level of information;
   computer readable code for caching a first level of information and at least one reference to a second level of information in a first buffer;
   computer readable code for caching a second level of information in a second buffer;
   computer readable code for refreshing a first level of information and a reference to a second level of information in a first buffer and a second level of information in a second buffer based on user preferences;
   computer readable code for receiving a request for interdependent data;
   computer readable code for retrieving a first level of data;
   computer readable code for determining a reference to a second level of data based on a request; and
   computer readable code for retrieving a second level data based on a determined reference.

9. The computer usable medium of claim 8 wherein the interdependent data is calendar data comprising calendar, year, and day records.

10. The computer usable medium of claim 8 wherein the user preference for an amount of first level data must be an integer in the range of 0 to 999, representing days.

11. The computer usable medium of claim 8 wherein the user preference for the refresh time must be an integer in the range of 0 and 999, representing minutes.

12. The computer usable medium of claim 8 wherein the retrieval of data may be done by a software application.

13. The computer usable medium of claim 8 wherein the cache buffers exist in memory on a computer system that is accessible by user endpoints.

14. The computer usable medium of claim 8 wherein if the retrieval of the first level of information is unsuccessful, the reference to the second level of information may be gathered directly from the database.

15. A system for providing increased efficiency in accessing interdependent data comprising:

means for receiving a user preference for an amount of a first level of information and a refresh time period for a first level of information;

means for receiving a user preference for an amount of a second level of information and a refresh time period for a second level of information;

means for caching a first level of information and at least one reference to a second level of information from said database into at first buffer;

means for caching a second level of information from said database into a second buffer;

means for refreshing a first level of information and a reference a second level of information in a first buffer and a second level of information in a second buffer based on user preferences;

means for receiving a request for interdependent data:

means for retrieving a first level of data, means for determining a reference to a second level of data based on a request; and means for retrieving a second level data based on a determined reference.

16. The method of claim 1 wherein the received user preferences are input into a Service Level Agreement monitor.

17. The method of claim 2 wherein the calendar data is stored in a buffer.

18. The computer usable medium of claim 8 wherein the received user preferences are input into a Service Level Agreement monitor.

19. The computer usable medium of claim 9 wherein the calendar data is stored in a buffer.

* * * * *